No. 711,170. Patented Oct. 14, 1902.
H. A. MICHELSON.
DEVICE FOR HOLDING BLOCKS OF COMPRESSED SALT OR FEED FOR CATTLE.
(Application filed Feb. 27, 1902.)
(No Model.)
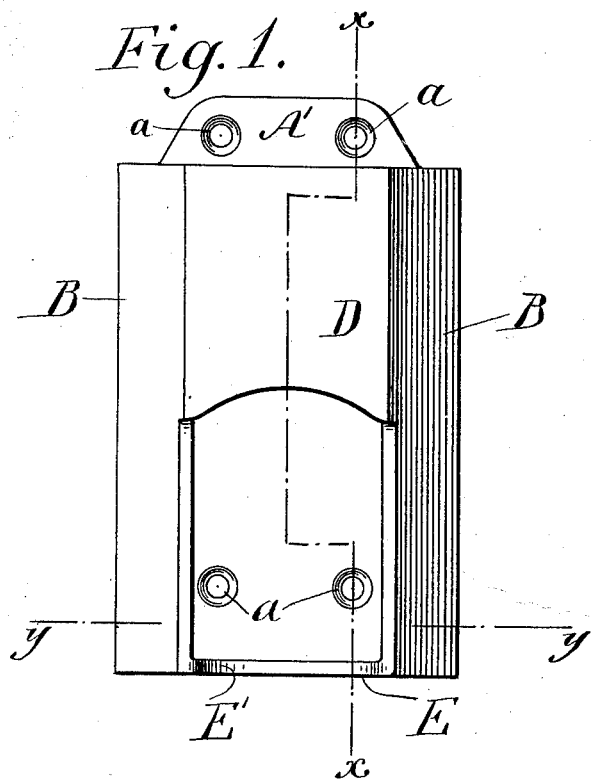
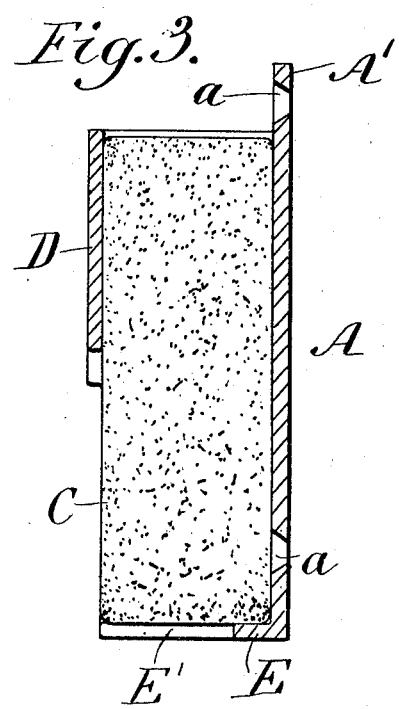
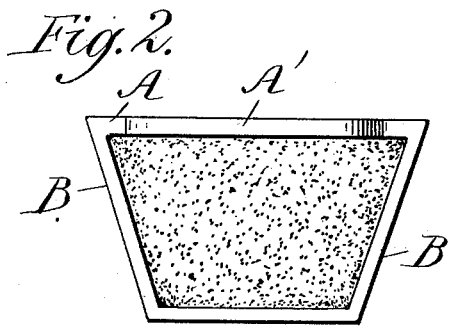
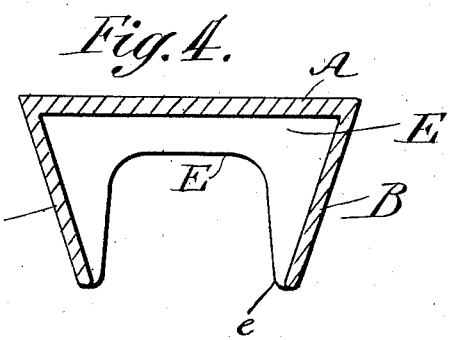
WITNESSES:
B. Patterson
E. Blohm
INVENTOR
H. A. Michelson
BY
Clark & Dennett Co.
ATTORNEYS

UNITED STATES PATENT OFFICE.

HANS ADOLPH MICHELSON, OF DULUTH, MINNESOTA, ASSIGNOR TO THE BELMONT STABLE SUPPLY COMPANY, OF BROOKLYN, NEW YORK.

DEVICE FOR HOLDING BLOCKS OF COMPRESSED SALT OR FEED FOR CATTLE.

SPECIFICATION forming part of Letters Patent No. 711,170, dated October 14, 1902.

Application filed February 27, 1902. Serial No. 95,915. (No model.)

*To all whom it may concern:*

Be it known that I, HANS ADOLPH MICHELSON, a citizen of the United States, and a resident of Duluth, county of St. Louis, and State of Minnesota, have invented certain new and useful Improvements in Devices for Holding Blocks of Compressed Salt or Feed for Cattle, of which the following is a specification, reference being had to the accompanying drawings, forming a part thereof, in which similar letters of reference indicate corresponding parts.

The present invention relates to that class of devices for holding blocks of compressed salt or feed for cattle, the object of the invention being to provide a device of this character wherein a block of such substance is so held that a portion thereof will be exposed at the front and lower end of the holder, so that the animal may readily reach and consume the same by licking; but the construction is such that the animal cannot throw out the entire block by lifting or pushing out of the holder. Thus I provide an economical device which obviates waste.

In a prior arrangement a holder has been provided having side and front walls presenting an oblique opening and rear supporting ledge at the lower end thereof, said side walls being forwardly converged to engage the correspondingly-shaped sides of the salt block to prevent the latter from falling out after its upper end gets below the upper portion of the oblique bottom opening. In another arrangement it has been proposed to provide forwardly-converging sides with front inward-rounded turns, presenting besides the bottom opening a front exposure extending the entire height of the walls, side ledges at the bottoms of the latter serving as rests for the block. In the former device, inasmuch as the consuming action of the animal tends to hollow out the exposed portion of the block, the unsupported side parts formed as a consequence of said hollowing readily become detached and collapse, thereby causing great waste. In the second device referred to an undesirable area of the block is not only exposed to moisture and dust, but such liberality of the extended front opening as will enable efficient consumption by the animal will also objectionably permit cribbing by the teeth, attended with great waste.

My invention embodies the advantages of the devices referred to, besides those in other constructions, and at the same time avoids the objections pointed out.

In the accompanying drawings, forming part of this specification, Figure 1 is a view showing, in front elevation, a salt-holding device embodying my invention. Fig. 2 is a plan view of said device, illustrating a block of salt within the same. Fig. 3 is a vertical section of said device with a contained block of salt, the section being taken in the plane indicated by the broken line $xx$, Fig. 1. Fig. 4 is a horizontal sectional plan of the device, the salt block being omitted, the section being taken in the plane indicated by the broken line $yy$, Fig. 1.

The device comprises the vertical backing-plate A, having the top web A', with countersunk perforations $a$ for the passage of screws to secure the device in position. Vertical forwardly-converging side walls B B contribute to form in conjunction with the plate A a holder, through the open upper end of which may be dropped the block C of compressed salt or food, as may be desired. A front section D spans the upper portion of the opening between the front edges of the walls.

A horizontal bottom E is provided for the holder. This bottom has a curved recess E', having rounded outer parts $e$, whereby the tongue of the animal may not be abraded by the process of licking. The block of food rests upon this bottom when inserted in the holder. The free edges of the recess E', as well as the bottom of the section D, are rounded off to avoid any angles that might tend to irritate the tongue of the animal. Countersunk screw-openings $a'$ are also made in the plate A above the lower edge to provide an additional means of securement for the device.

With the device secured in position as purposed and a block of salt introduced therein a sufficient portion of the latter will be exposed at the bottom and lower front portion of the hopper to permit its consumption by the tongue of the animal. The limitation of the block exposure by the front section D, however, prevents such access to the block as would be required to lift or push the block out of the holder, and also it prevents nibbling of the same by the teeth of the animal. Consequently the section D constitutes a guard or shield for obviating the waste of the material that would result, yet at the same time affording such an upward sweep of the tongue in contact with the block-surface as will satisfy all requirements. Inasmuch as such upward licking action will occasion the vertical hollowing of the exposed part of the block and result in the formation of weak shell-like parts at the lower sides thereof, these latter would be liable to wastefully crumble and detach, especially when contacted with by the tongue or other portion of the animal's mouth. This contingency is prevented, however, by the presence of the supporting-bottom and the continuation of the complete width of converging side walls down to the same, thus providing for the substantial support of said reduced side portions of the block against both a dropping and lateral detaching movement from the holder. While so supported such reduced block portions will be readily accessible to the tongue of the animal, so that their proper further consumption can be completed and the balance of the block gravitally descend until full service has been secured.

Having now described my invention, what I claim as new, and desire to secure by Letters Patent, is—

1. In a holder for compressed salt or feed, a hopper having an upper opening, and lower intersecting horizontal and vertical front openings, the latter limited by a guard or shield at the upper front portion of the hopper.

2. In a holder for compressed salt or feed, a hopper having vertical sides, with lower horizontal ledges and presenting an upper opening, and intersecting lower horizontal and vertical front openings, the latter limited by a guard or shield at the upper front portion of the hopper.

3. In a holder for compressed salt or feed, a hopper having vertical sides with lower horizontal side and transverse ledges, and presenting an upper opening, and intersecting lower horizontal and vertical front openings, the latter limited by a guard or shield at the upper front portion of the hopper.

4. In a holder for compressed salt or feed, a hopper having vertical converged sides, bottom side ledges extending the width of said sides, a transverse ledge, said hopper having an upper opening and intersecting horizontal and vertical front openings, the latter being limited by a guard or shield at the upper front portion of the hopper.

5. A holder for compressed salt or feed, comprising integrally a backing-plate, forwardly-converging vertical sides with lower side and transverse ledges, presenting an upper transverse front section, said parts forming a hopper with upper opening, and intersecting lower horizontal and front openings, the latter limited by the upper front section.

In testimony that I claim the foregoing as my invention I have signed my name, in presence of two witnesses, this 31st day of December, 1901.

HANS ADOLPH MICHELSON.

Witnesses:
OSCAR MITCHELL,
FLORENCE EMANUELSON.